(12) United States Patent
Huibers et al.

(10) Patent No.: US 8,630,043 B2
(45) Date of Patent: Jan. 14, 2014

(54) COLOR LIGHT COMBINER

(75) Inventors: Andrew Gerritt Huibers, Sunnyvale, CA (US); Regis Grasser, Orleans (FR)

(73) Assignee: Texas Instruments Incorporated, Dallas, TX (US)

( * ) Notice: Subject to any disclaimer, the term of this patent is extended or adjusted under 35 U.S.C. 154(b) by 141 days.

(21) Appl. No.: 13/206,241

(22) Filed: Aug. 9, 2011

(65) Prior Publication Data

US 2011/0292514 A1 Dec. 1, 2011

Related U.S. Application Data

(62) Division of application No. 12/062,788, filed on Apr. 4, 2008, now Pat. No. 7,995,279.

(51) Int. Cl.
*G02B 27/14* (2006.01)

(52) U.S. Cl.
USPC ............................ 359/634; 359/636; 359/640

(58) Field of Classification Search
USPC ................ 359/618, 629, 625, 636, 638, 640; 362/235, 241; 353/33, 31, 39
See application file for complete search history.

(56) References Cited

U.S. PATENT DOCUMENTS

| | | | |
|---|---|---|---|
| 5,146,248 A | 9/1992 | Duwaer et al. | |
| 5,943,171 A | 8/1999 | Budd et al. | |
| 7,630,078 B1 | 12/2009 | Nabutovsky et al. | |
| 2006/0007401 A1 | 1/2006 | Ho et al. | |
| 2006/0044523 A1 | 3/2006 | Teijido et al. | |
| 2008/0137209 A1* | 6/2008 | Kim .............................. | 359/638 |

* cited by examiner

*Primary Examiner* — Alicia M Harrington
(74) *Attorney, Agent, or Firm* — Warren L. Franz; Wade J. Brady, III; Frederick J. Telecky, Jr.

(57) ABSTRACT

For combining light from different light sources that are spatially apart, an optical system comprises a prism assembly that comprises a totally-internally-surface and a dichroic filter. The totally-internally-surface and the dichroic filter are configured for reflecting light of different colors or polarizations, so as to combine light of different polarization or colors into a single beam.

20 Claims, 12 Drawing Sheets

COLOR LIGHT COMBINER

This application is a divisional of application Ser. No. 12/062,788, filed Apr. 4, 2008.

TECHNICAL FIELD OF THE DISCLOSURE

The technical field of this disclosure relates to the art of optical devices; and more particularly to the art of optical systems for directing illumination light to light valves in imaging systems.

BACKGROUND OF THE DISCLOSURE

In recent years, solid-state light sources and other narrow-wavelength-band and/or polarized light sources capable of producing visible light have drawn significant attention as alternative light sources to traditional light sources for use in imaging systems (such as projection systems) due to many advantages, such as compact size, greater durability, longer operating life, and lower power consumption. For example, solid state sources such as LASERs, light-emitting-diodes (LEDs), and pumped non-linear optical crystals are increasingly used imaging systems, especially imaging systems that employ one or more light valves each of which comprises an array of individually addressable pixels.

Regardless of their widely recognized superior properties over traditional light sources, solid-state light sources can be difficult to optically couple with light valves in imaging systems for illuminating light valves. For example, it is difficult to generate a far-field illumination area with uniform illumination intensity at a light valve location using solid-state or narrow-band light sources. This arises from a fact that the illumination light from the solid-state sources can be distributed over a large solid angle, up to a full hemisphere.

In color imaging applications using solid-state sources (or other narrow-band sources), light sources comprising one or more solid state sources emitting light of different colors or spectral profiles are provided to illuminate light valves. It is desired that the light of different colors illuminates a light valve along substantially the same optical path, for instance, with substantially the same incident angle to the pixels of the light valve. It is desirable that the multiple beams, such as colored beams, overlap to occupy the same angular and spatial optical phase space.

Because a single light source may have limited output power, which may not be sufficient to generate images with satisfactory brightness, multiple light sources for the same color light (with the same wavelength or different wavelengths, and with the same or different electro-magnetic polarization state) can be employed in an imaging system. Regardless of different spatial arrangements, the light beams from separate light sources are spatially separated when exiting from the light sources. Without proper management, the spatially separated light beams may result in distorted illumination field, as well as other unwanted optical effects at the light valve, such as poor image uniformity and reduced system brightness.

Therefore, what is desired is an optical system that is capable of directing light from light sources to one or more light valves in imaging systems.

SUMMARY

In one example, an optical device is disclosed herein. The device comprises: a prism assembly comprising first and second prisms that are bonded together; a first dichroic filter disposed on a facet of the first prism; and a second dichroic filter disposed on a facet of the second prism.

In another example, an optical device is disclosed herein. The device comprises: first prism assembly comprising first and second prisms that are bonded together; second prism assembly comprising third and fourth prisms that are bonded together; first dichroic filter disposed on a facet of the first prism assembly; and a second dichroic filter disposed on a facet of the second prism assembly.

In yet another example, a method is disclosed herein, comprising: providing light from a first light source; reflecting the light by a first dichroic filter at a first interface; reflecting the light by a totally-internally-reflective surface at a second interface; and collecting the reflected light from the totally-internally-reflective surface and delivering the collected light towards a desired direction.

In yet another example, an imaging system is disclosed herein, comprising: an optical assembly that comprises: first prism assembly comprising first and second prisms that are bonded together; second prism assembly comprising third and fourth prisms that are bonded together; a first dichroic filter disposed on a facet of the first prism assembly; and a second dichroic filter disposed on a facet of the second prism assembly; a first light guide comprising an exit that is attached to the first dichroic filter; a second light guide comprising an exit that is attached to the second dichroic filter; a third light guide comprising an exit that is bonded to a facet of the second prism assembly with an optical bonding material; and a fourth light guide comprising an exit that is bonded to a facet of the first prism assembly with an optical bonding material; a first light source coupled to an entrance of the first light guide; a second light source coupled to an entrance of the second light guide; and a third light source coupled to an entrance of the third light guide; and a light valve comprising an array of individually addressable pixels for modulating the light from the optical assembly.

BRIEF DESCRIPTION OF DRAWINGS

FIG. 1b schematically illustrates a perspective view of the optical system in FIG. 1a;

FIG. 2b schematically illustrates a beam of light incident to a dichroic filter in FIG. 1a;

FIG. 6 schematically illustrates an exemplary imaging system that employs an exemplary optical system as illustrated in FIG. 1a;

FIG. 7 schematically illustrates another exemplary imaging system that employs an exemplary optical system as illustrated in FIG. 1a;

FIG. 8 schematically illustrates yet another exemplary imaging system that employs an exemplary optical system as illustrated in FIG. 1a;

DETAILED DESCRIPTION OF SELECTED EXAMPLES

Disclosed herein is an optical system for combining optical paths of light from multiple light sources using a prism that comprises a totally-internally-surface and an optical filter that can be a dichroic filter or a reflective polarizing filter. The totally-internally-surface and the optical filter are provided for reflecting light of different colors. In the following, the optical system will be discussed with reference to particular examples. However, it will be appreciated by those skilled in the art that the following discussion is for demonstration purpose, and should not be interpreted as a limitation. Other variations within the scope of this disclosure are also applicable.

Figure 1A:
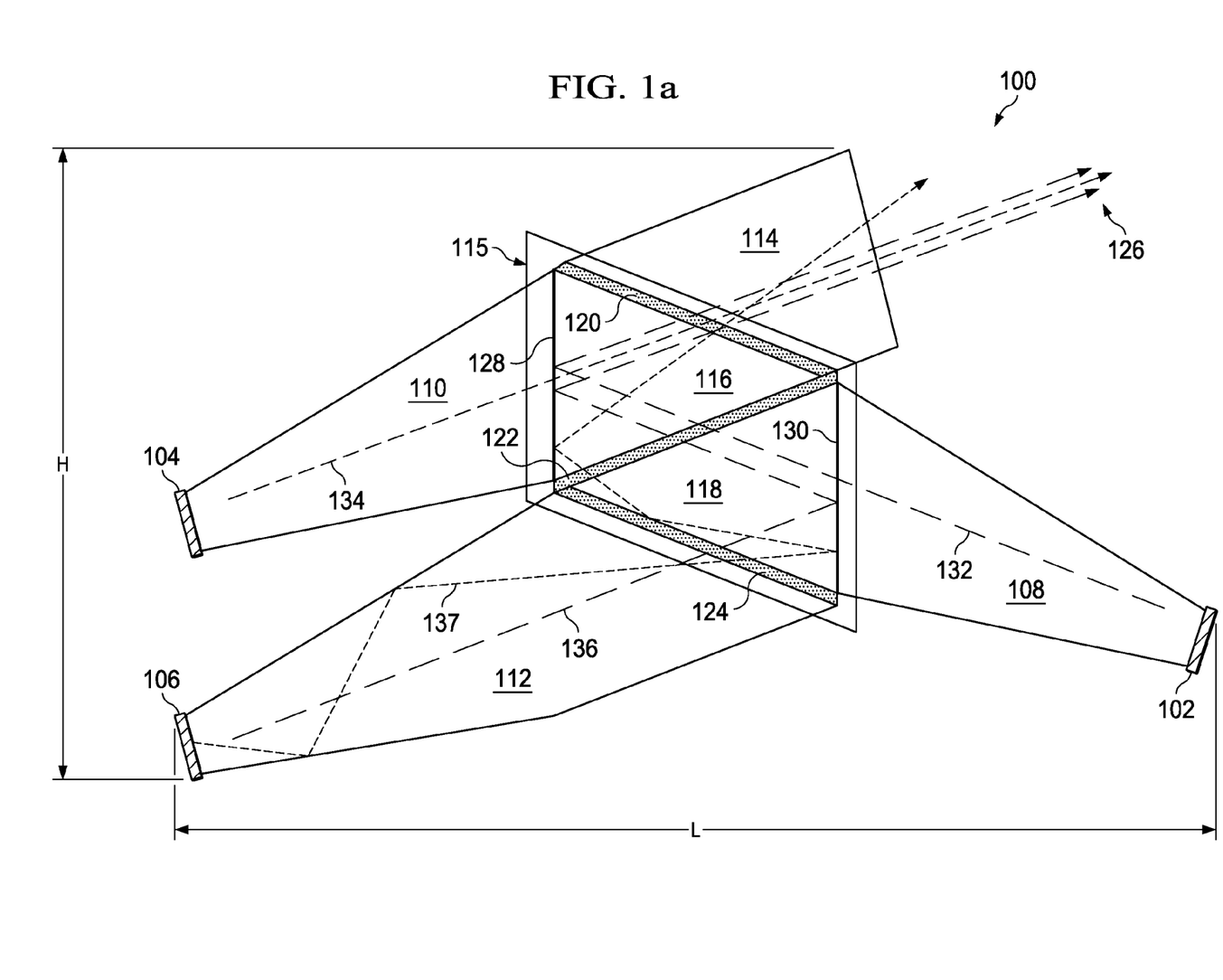
FIG. 1a is a diagram showing an exemplary optical system capable of combining light from multiple light sources towards a desired direction using a dichroic filter.
Figure 1B:
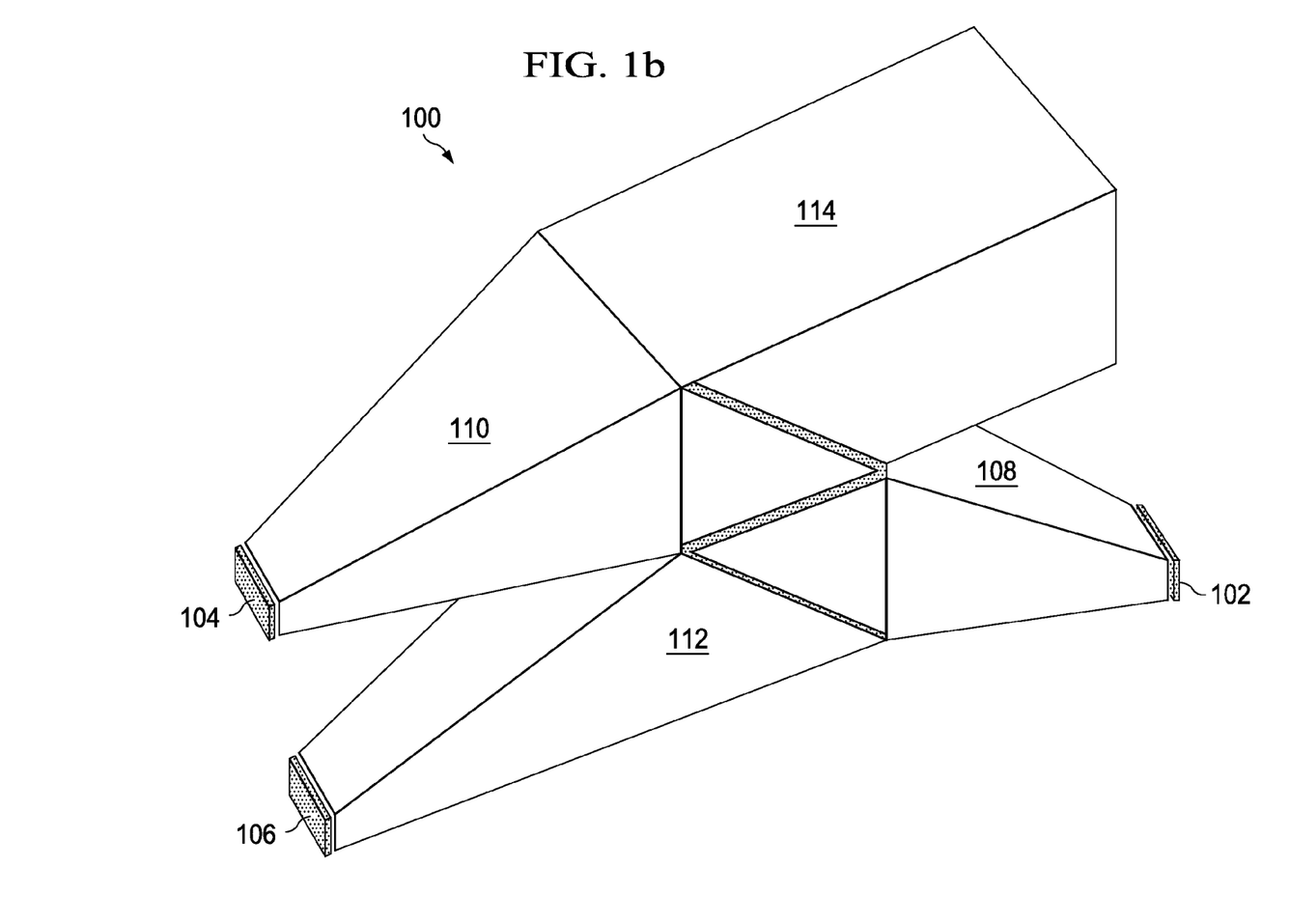

Referring to the drawings, FIG. 1*a* is a diagram showing an exemplary optical system of this disclosure. Optical system 100 in this example comprises light sources 102, 104, and 106, optical guides 108, 110, 112, and 114, and prism assembly 115. Light sources 102, 104, and 106 provide illumination light; and each can comprise any desired light emitting devices. For example, the light sources can comprise solid-state light sources, such as lasers, LEDs, or other limited-wavelength-range or polarized sources, or any combinations thereof. For example, the light sources can incorporate AlGaInP light emitting diodes, InGaN light emitting diodes, resonant cavity LEDs, LEDs with non-Lambertian emission profiles, LEDs producing polarized light, or other suitable LEDs. Laser light sources can be vertical cavity surface emitting lasers (VCSEL), extended cavity surface emitting lasers (e.g. NECSEL) or any other suitable lasers.

When a single light source (e.g. a LED die) is employed for providing light of a specific color, the light may not have sufficient intensity due to the limited output power of the light source. In this instance, multiple light sources can be arrayed for providing light of the specific color. For example, light source 102 (104, and/or 106) may comprise multiple solid-state light sources to provide desired output power.

In addition to solid-state light sources, the light sources 102, 104, and 106 each can be other types of light emitting devices, such as discharge lamps (e.g. mercury lamps, metal halide lamps, and xenon lamps) or organic light-emitting films, phosphors, quantum dots, non-linear optical elements or other types of light emitting devices.

In the example as illustrated in FIG. 1*a*, the light sources 102, 104, and 106 can provide light of different colors. For example, light source 102 provides light of the red color; light source 104 provides light of the green color; and light source 106 provides light of the blue color. In other examples, the light sources may be designated for providing light of any combinations of colors, such as cyan, yellow, magenta, and white. Light of a specific color is referred to as an electromagnetic wave having a wavelength or a wavelength range that is substantially within the wavelength range of the particular color. For examples, red light is referred to as light having a wavelength within the range of 620 nm to 750 nm. Green light is referred to as light having a wavelength within the range of 495 nm to 570 nm. Blue light is referred to as light having a wavelength within the range of 450 nm to 495 nm. Accordingly, dichroic filters for the red, green, and blue light respectively reflect the light in the red, green, and blue color ranges and pass the light of other colors.

Because the light of the desired colors are provided by different light sources that are disposed in different spatial locations, the principal optical axes of the light sources are spatially separated. In order to combine the principal optical axes such that the light propagating along the principal optical axes of the separate light sources can propagate along substantially a common desired optical path (e.g. 126), the light sources are optically coupled with light guides 108, 110, and 112 that direct the light from the light sources towards prism assembly 115; and the prism assembly combines the principal optical axes of the light sources, as will be detailed in the following.

As illustrated in FIG. 1*a*, the prism assembly (115) in this example comprises prisms 116 and 118, and dichroic filters 128 and 130. Prisms 116 and 118 each many be a triangular prism; and are bonded together by an optical material (122), such as glue or any other suitable adhesive materials that are transparent to the light from the light sources. The material is typically a lower optical index that the prism material. The prisms can also only be bonded together at parts of their surfaces, so that there is an air gap over most of the interface. Dichroic filter 130 reflects the light of the color that is same as the color of the light from light source 106, and transmits the color that is same as the color of the light from light source 102. For example, when light source 106 emits the blue light, dichroic filter 130 reflects the blue light and passes red light. Dichroic filter 128 reflects the light of the color that is same as the color of the light from light sources 102 and 106. For example, when light source 102 emits red light and source 106 emits blue light, and source 104 emits green light, dichroic filter 128 reflects red light and blue and passes green light. Dichroic filters 128 and 130 can be disposed at the surfaces of prisms 116 and 118; and the dichroic filters 128 and 130 can be substantially parallel to each other, although it is not required.

Light guides 108, 110, and 112 are respectively coupled to light sources 102, 104, and 106. In one example, the light guides are disposed such that the principal optical axis of each light source is substantially aligned to the principal optical axis of the corresponding light guide. Specifically, the principal optical axis of light source 102 is substantially aligned to the principal optical axis (132) of light guide 108 before prism assembly 115. The principal optical axis of light source 104 is substantially aligned to the principal optical axis (134) of light guide 110 before prism assembly 115. The principal optical axis of light source 106 is substantially aligned to the principal optical axis (136) of light guide 112 before prism assembly 115. In other examples, the light guides can be optically coupled to the light sources in many other desired ways. In addition to confining the light, the light guides also spatially homogenize the light, and can smooth out inhomogeneity in the light sources.

The light guides (108, 110, and 112) each can take any desired forms. In the example as illustrated in FIG. 1*a*, the light guides each have tapered edges along the length (the principal axis) with the narrow entrance being coupled to a light source and the wider exit being coupled to a facet of prism assembly 115. For optimizing the optical efficiency, the wider exit of each light guide has an area that is substantially equal to the prism facet to which the wider exit is coupled. In other examples, the light guides (108, 110, and 112) each can be other types of light guides, such as guides with substantially straight edges or curved edges or any combinations thereof. In the example as illustrated in FIG. 1a, the light guides each have a solid-body with a suitable refractive index, such as 1.5 or other suitable values.

The other end (i.e. the wider exit) of each light guide is attached to a facet of prism assembly 115; and forms a TIR interface (an interface where Total Internal Reflection occurs for sufficiently glancing angles) with the prism facet. Specifically, the exit of light guide 108 is attached to a facet of prism 118 in prism assembly 115 with dichroic filter 130 being laminated therebetween—forming a TIR interface between dichroic filter 130 and the exit of light guide 108. The exit of light guide 112 is attached to a facet of prism 118 through optical bonding material 124 that has a different refractive material than the light guide 112—resulting in a TIR interface at the exit of light guide 112. The exit of light guide 110 is attached to a facet of prism 116 in prism assembly 115 through dichroic filter 128.

The entrance of light guide 114 is attached to a facet of prism 116 through optical bonding material 120 that has a different refractive index—resulting in a TIR interface at the entrance of light guide 114. The TIR interfaces at the exit of light guide 112 and the entrance of light guide 114 may have substantially the same optical property (e.g. the same TIR angle).

With the dichroic filters, the TIR interfaces, and the optical arrangements thereof, the light from separate light sources can be combined. Specifically, the light propagating along the principal optical axes (132, 134, and 136) of light guides 108, 110, and 112 can be directed towards the desired direction 126.

For example, the light from light source 102 is collected by light guide 108 and delivered to prism assembly 115. Such light enters into the body of prism 118 of prism assembly 115 through dichroic filter 130. The light passes through the body of prism 118 and enters into prism 116 of prism assembly 115 through optical bonding material 122 and the TIR interface between prism 116 and 118. The light is reflected by dichroic filter 128 towards the desired optical path 126. At the entrance of light guide 114, the light exits from prism assembly 115 through bonding material 120, and is collected by light guide 114 that directs the collected light towards the desired optical path 126.

Light from light source 104 is collected by light guide 110 and delivered to prism assembly 115. Such light enters into the body of prism 116 of prism assembly 115 through dichroic filter 128; passes through the body of prism 116, and is collected by light guide 114 that directs the collected light towards the desired optical path 126.

Light from light source 106 is collected by light guide 112 and delivered to prism assembly 115. Such light enters into the body of prism 118 of prism assembly 115 through optical material 124; and is reflected by dichroic filter 130. The reflected light by dichroic filter 130 is incident to the interface between prism 116 and the exit of light guide 110 through optical material 122, wherein the interface comprises dichroic filter 128. Dichroic filter 128 reflects the light from light source 102, the light from light source 106. Two optical ray paths 136 and 137 are shown in FIG. 1a. Path 136 proceeds as described above. Path 137 reflects twice from the sidewalls of light guide 112. Path 137 subsequently reflects from the interface between prism 130 and optical material 124. Such reflection is enabled by directing the light to the TIR surface at an incident angle smaller than the TIR angle of the interface, which will be detailed in the following with table 1, table 2, and FIG. 2a.

For demonstration purpose, table 1 shows the refractive indices of the prisms (116 and 118) of prism assembly 115 and the optical bonding material (120, 122, and 124). The TIR angle in table 1 is the TIR angle of the TIR interfaces between the exit of light guide 112 and prism 118 and between prism 118 and prism 116 for different combinations of the refractive indices of the prism and the optical bonding material. For example, when the refractive indices of the prism and the optical bonding material are 1.5 and 1.4, respectively, the TIR angle of the interface between light guide 112 and prism 118 can be 68.96° (surface normal=0°). The maximum angle in table 1 shows the maximum angular spread of the guided light that is allowed by the TIR angles, while remaining in the guide. For example wherein the TIR angle of an interface is 68.96°, light incident to the interface at 68.96° or less can pass through the interface without being reflected. Otherwise, the incident light will be reflected by the interface (remain in the guide).

TABLE 1

| Refractive index of the prisms | Refractive index of the bonding material | TIR angle | Maximum beam angle deviation from interface |
|---|---|---|---|
| 1.5 | 1.45 | 75.16 | 14.84 |
| 1.5 | 1.4 | 68.96 | 21.04 |
| 1.5 | 1.3 | 60.07 | 29.93 |
| 1.5 | 1.2 | 53.13 | 36.87 |
| 1.5 | 1.1 | 47.17 | 42.83 |
| 1.5 | 1 | 41.81 | 48.19 |

By changing the aspect ratio of the prism (i.e. the ratio between the vertical edge and another edge of the prism in the symmetric prism case shown in FIG. 1a), different TIR encounter angles (i.e. the angle from surface perpendicular at which light is incident to an interface) and dichroic filter encounter angles (i.e. the incident angle $\theta_{in}$ of light to a dichroic filter) can be obtained, as shown in Table 2.

TABLE 2

| Prism aspect ratio | TIR encounter angle | Dichroic filter encounter angle |
|---|---|---|
| 0.5 | 0 | 45 |
| 1 | 36.87 | 26.57 |
| 1.5 | 53.13 | 18.43 |
| 2 | 61.93 | 14.04 |
| 2.5 | 67.38 | 11.31 |

Figure 12:
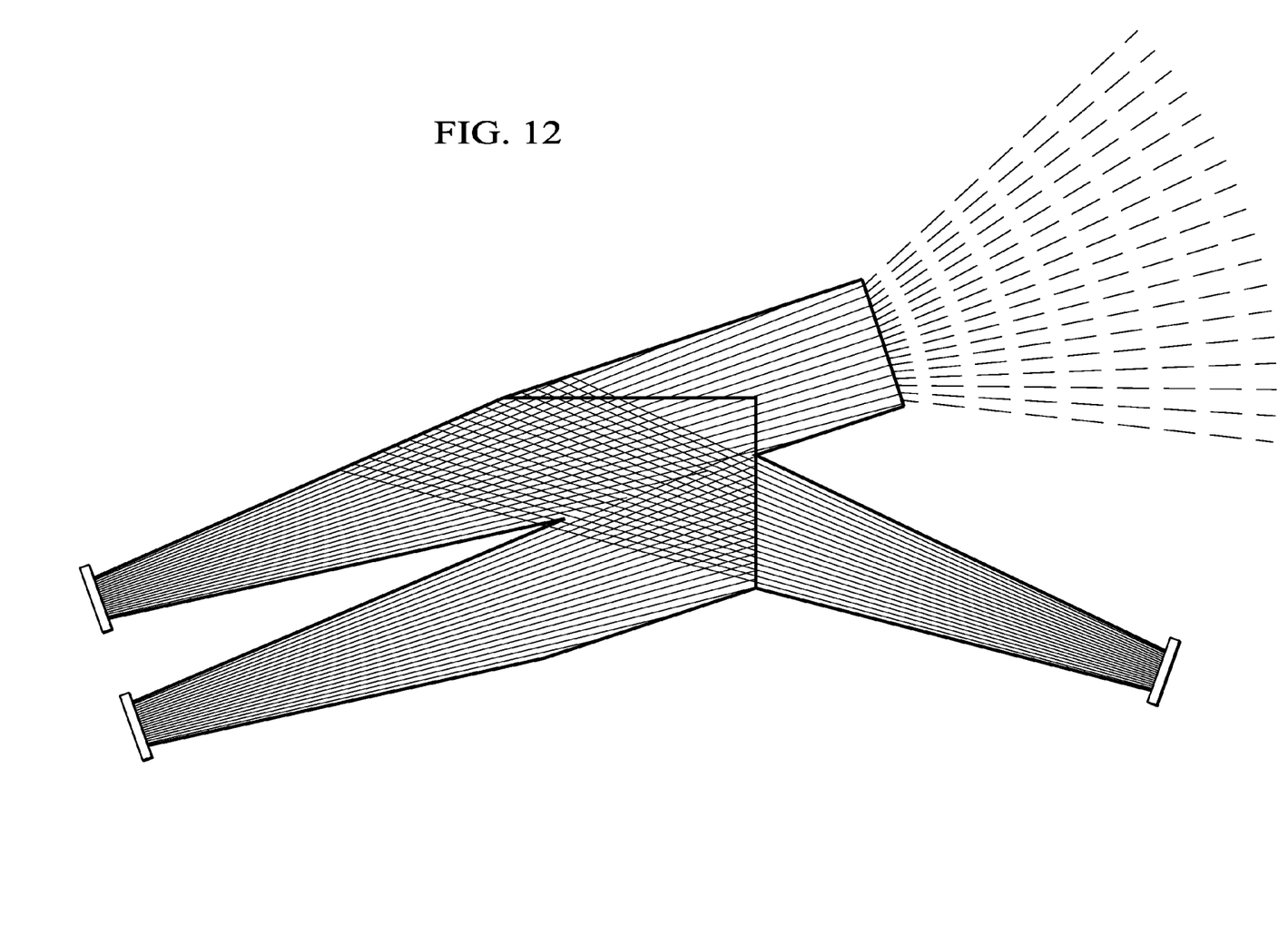
FIG. 12 is a diagram showing an optical ray trace of the optical system in FIG. 1*a*.

In one example with reference to table 1 and table 2, the TIR angle is 68.96° when the refractive indices of the prism and the bonding material are 1.5 and 1.4, respectively. To ensure that the TIR encounter angles is smaller than the TIR angle) (68.96°, the prism may have an aspect ratio of 2.5 or lower. However, given the allowed maximum angular dispersion, the prism may have an aspect ratio of 1.5 or less because the corresponding TIR encounter angle is 15.83° smaller than the TIR angle 68.96° when the material of the prism has a refractive index of 1.5 and the optical bonding material has a refractive index of 1.4. In order to obtain the minimal incident angle of the light to the dichroic filter, the prism is preferred to have an aspect ratio of 1.5, which corresponds to the dichroic filter encounter angle of 18.43°. A low (more surface perpendicular) angle of incidence to the dichroic filter will mean that the S and P polarizations can be filtered more effectively and with fewer thin film layers than for larger angles. A ray-trace diagram for the optical system illustrated in FIG. 1a is shown in FIG. 12.

Figure 2A:
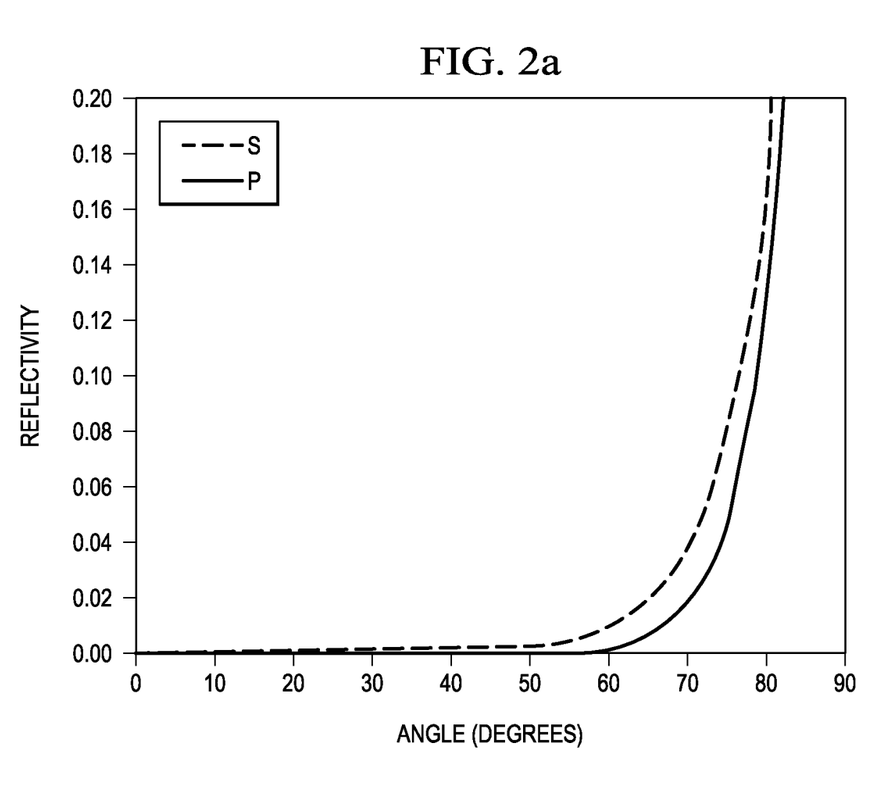
FIG. 2a shows a diagram of the reflectivity of the s and p wave components of an incident light passing through an interface between two optical mediums having different refractive indices.

For demonstration purpose, FIG. 2a plots a diagram of the reflectivity of the S and P wave-components of light passing across an interface from one medium with refraction index of 1.4 to another medium with refractive index of 1.5 at different incident angles. It can be seen that the reflectivity increases as the incident angle increases. The reflectivity starts to increase exponentially when the incident angle is 65° or higher. Therefore, crossing an n=1.4 to n=1.5 interface at 53° as in the aspect ratio=1.5 prism case will result in fairly low reflection losses at this interface.

Figure 2B:
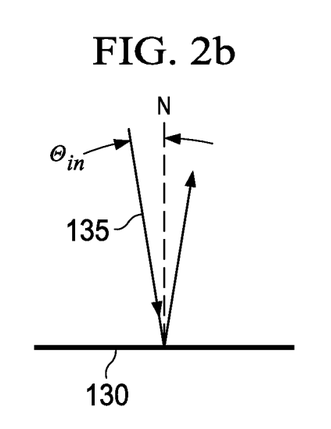

It can be seen from FIG. 1a, table 1, table 2, and FIG. 2b that the interfaces at the locations of dichroic filters 130 and 128 can have substantially the same optical configuration (except different dichroic filters). For the same light from light source 106, one of the interfaces (i.e. the interface at the location of dichroic filter 130) reflects the light by a dichroic filter (130); while the other interface (i.e. the interface at the location of dichroic filter 128) reflects the same light by the interface. The light between the two interfaces travels along the opposite direction to the light incident to the first interface; and travels along the desired direction (126) or the direction along the direction incident to the first interface after being reflected by the second interface.

Components of the optical system (100) can be arranged such that light from the light sources is incident to the dichroic filters at small incident angles—e.g. closer to the normal direction, as schematically illustrated in FIG. 2b.

Referring to FIG. 2b, light 135 is the light from light source 106 after being reflected by dichroic filter 130. Light 135 is incident to dichroic filter 130 at an incident angle $\theta_{in}$. The incident angle $\theta_{in}$ can be 30° or less, 20° or less, or 10° or less to the normal direction N of dichroic filter 130. It is noted that even though FIG. 2a shows only the incident angle of light 135 to dichroic filter 130, other incident angles to the dichroic filters may have the same small angles. Specifically, the light from light source 106 may be incident to dichroic filter 130 at an incident angle of 30° or less, 20° or less, or 10° or less to the normal direction N of dichroic filter 130. The light from light source 102 may be incident to dichroic filter 128 at an incident angle of 30° or less, 20° or less, or 10° or less to the normal direction N of dichroic filter 128.

Referring again to FIG. 1a, because the light from the light sources can be incident to the dichroic filters at small incident angles, the optical system 100 can be made very compact. For example, the length L of the optical system can be 200 cm or less, 50 cm or less, 20 cm or less, 10 cm or less, or 5 cm or less. The height H of the optical system can be 100 cm or less, 30 cm or less, 10 cm or less, 5 cm or less, or 2 cm or less. In other examples, the optical system may have any suitable dimensions.

Figure 3:
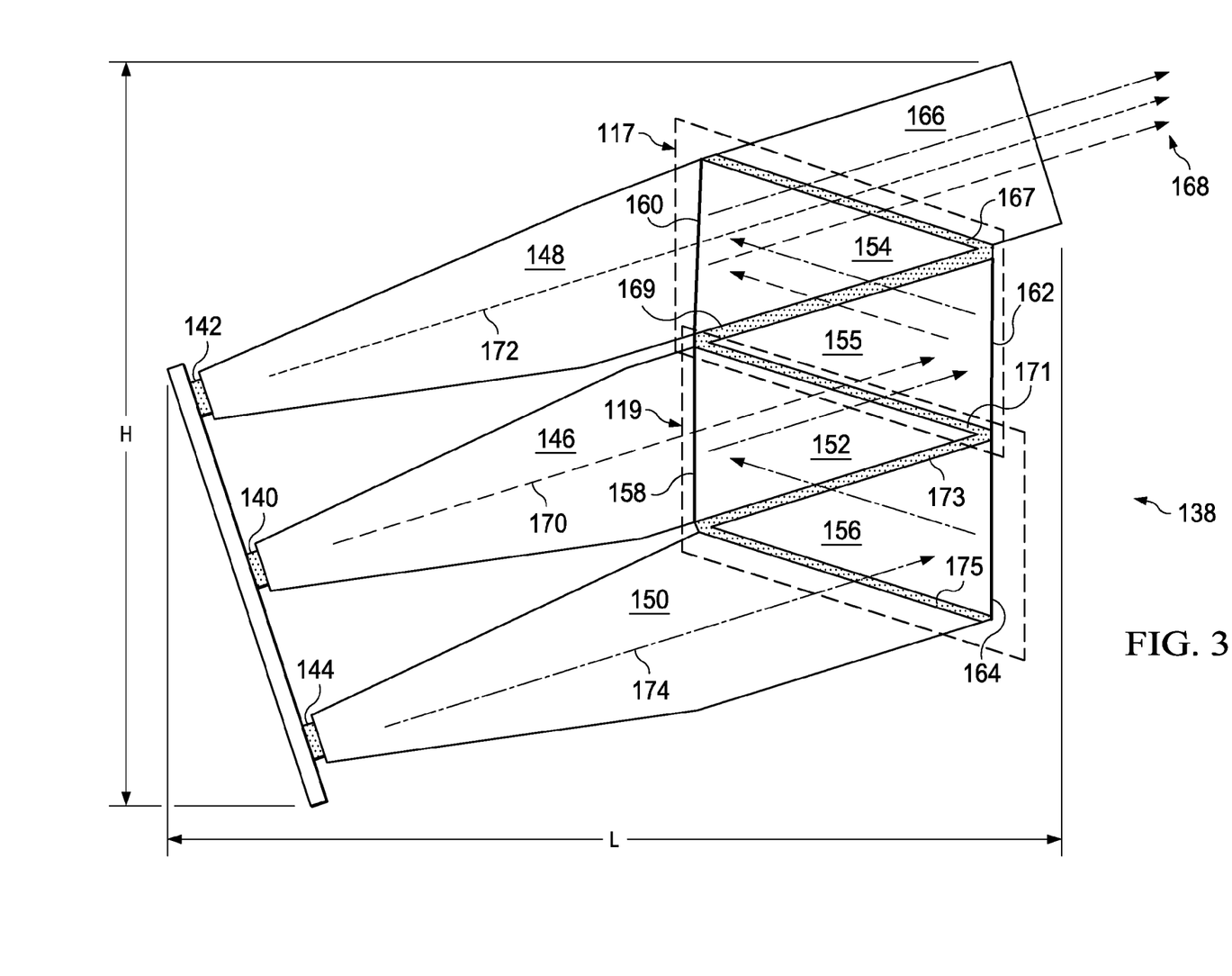
FIG. 3 is a diagram showing another exemplary optical system capable of directing light from different light sources towards a desired direction using a prism assembly with a dichroic filter.

Another exemplary optical system is schematically illustrated in FIG. 3. Referring to FIG. 3, optical system 138 in this example comprises light sources 140, 142, and 144, light guides 146, 148, 150 and 166, and prism assemblies 117 and 119.

Light sources 140, 142, and 144 can be the light sources 102, 104, and 106 as discussed above with reference to FIG. 1a for provide illumination light, preferably illumination light of different colors, which will not be repeated herein. In this particular example, light sources 140, 142, and 144 are solid-state light sources for providing red, green, and blue colors respectively. The solid-state light sources 140, 142, and 144 can be formed on/in the same substrate, such as a semiconductor substrate (e.g. silicon) or a packaging substrate.

Because the light sources (140, 142, and 144) are disposed at different locations, the principal optical axes of the light sources are spatially separated. In order to combine the principal optical axes such that the light propagating along the principal optical axes of the separate light sources can propagate along substantially a common desired optical path (e.g. 168), the light sources are optically coupled with light guides 146, 148, and 150 that direct the light from the light sources towards prism assemblies 117 and 119. The prism assembly combines the principal optical axes of the light sources, as will be detailed in the following.

As illustrated in FIG. 3, light guides 146, 148, and 150 are respectively coupled to light sources 140, 142, and 144. In one example, the light guides are disposed such that the principal optical axis of each light source is substantially aligned to the principal optical axis of the corresponding light guide. Specifically, the principal optical axis of light source 140 and the principal optical axis (170) of light guide 146 are substantially coincident to the optical axis of light source 140 before prism assembly 119. The principal optical axis of light source 142 and the principal optical axis (172) of light guide 148 are substantially coincident before prism assembly 117; and the principal optical axis of light source 144 and the principal optical axis (174) of light guide 150 are substantially coincident before prism assembly 119. In other examples, the light guides can be optically coupled to the light sources in many other desired ways.

The light guides (146, 148, and 150) each can take any desired forms. In the example as illustrated in FIG. 3, the light guides each have tapered edges along the length (the principal axis) with the narrow entrance being coupled to a light source and the wider exit being coupled to a facet of the prism assemblies (117 and 119). For optimizing the optical efficiency, the wider exit of each light guide has an area that is substantially equal to the prism facet to which the wider exit is coupled. In other examples, the light guides (146, 148, and 150) each can be other types of light guides, such as guides with substantially straight edges or curved edges or any combinations thereof. The light guides (146, 148, and 150) each have a solid body that comprising an optical material with a refractive index. In other examples, the light guides can have hollow bodies surrounded by reflective walls.

For combining the principal optical axes of the separate light sources, prism assemblies 117 and 119 are provided. Prism assembly 117 comprises prisms 154 and 155 that are bonded by an optical bonding material (169) with a suitable refractive index. A facet of prism 154 is coupled to the exit of light guide 148 through dichroic filter 160. Dichroic filter 160 is to be used for reflecting the light from light sources 140 and 144, and transmitting the light from light source 142.

Another facet of prism 154 is bonded to the entrance of light guide 166 by an optical bonding material (167) that has a suitable refractive index. A facet of prism 155 is disposed thereon a reflective surface (162), which can be a mirror surface or a TIR interface (an interface where Total Internal Reflection occurs for sufficiently glancing angles).

Prism assembly 117 is bonded to prism assembly 119 through the attachment/bonding of prism 155 of prism assembly 117 and prism 152 of prism assembly 119 by optical bonding material 171 that has a suitable refractive index. Another facet of prism 152 is disposed thereon dichroic filter 158; and is coupled to the exit of light guide 146 through dichroic filter 158. Prism 152 and prism 156 are bonded by optical bonding material 173 that has a suitable refractive index. Prism 156 has a reflective surface 164 that can be a mirror surface. Prism 156 is bonded to the exit of light guide 150 at a facet using optical bonding material 175 that has a suitable refractive index.

In operation, light from light source 140 is collected by light guide 146 and delivered to prism 152 of prism assembly 119. Such light enters into the body of prism 152 through dichroic filter 158 and enters into prism 155 of prism assembly 117 through optical bonding material 171. The light is reflected by reflective surface 162 towards the interface between prism 154 and the exit of light guide 148. When dichroic filter 160 is designated for reflecting light of the same color as the light from light source 140, the light from light source 140 and reflected by reflective surface 162 is further reflected by dichroic filter 160 towards the desired optical path 168. When dichroic filter 160 is designated for reflecting light of a different color as the light from light source 140, the light from light source 140 and reflected by reflective surface 162 is reflected by the dichroic filter at the interface between prism 154 and the exit of light guide 148. At the entrance of light guide 166, the light reflected by dichroic filter 160 exits from prism 154 through bonding material 167, and is collected by light guide 166 that directs the collected light towards the desired optical path 168.

Light from light source 142 is collected by light guide 148 and delivered to prism 154 of prism assembly 117. Such light enters into the body of prism 154 through dichroic filter 160; passes through the body of prism 154, and is collected by light guide 166 through optical bonding material 167. Light guide 166 directs the collected light towards the desired optical path 168.

Light from light source 144 is collected by light guide 150 and delivered to prism 156 of prism assembly 119. Such light enters into the body of prism 156 through optical bonding material 175 and is reflected by reflective surface 164 that can be a reflective surface of a mirror. The reflected light from surface 164 enters into prism 152 through optical material 172 and travels towards dichroic filter 158. Some of the light can also totally internally reflect from the interface between prism 156 and optical bonding material 175, or the interface between prism 152 and optical bonding material 171. After being reflected by dichroic filter 158, the light enters into prism 155 through optical bonding material 171 and travels towards reflective surface 162. The reflective surface 162 reflects the light towards the interface between prism 154 and the exit of light guide 148. When dichroic filter 160 is designated for reflecting light of the same color as the light from light source 144, the light from light source 144 and reflected by reflective surface 162 is further reflected by dichroic filter 160 towards the desired optical path 168.

It is noted that dichroic the TIR surface at the interface between prism 154 and the exit of light guide 148 can be used for reflecting light from one of the light sources, such as light sources 140 or 144. Such reflection can be ensured by directing the light to the TIR surface at an angle more glancing (larger) than the TIR angle of the TIR surface, as discussed above with reference to table 1, table 2, and FIG. 2a, which will not be repeated herein.

Figure 4:
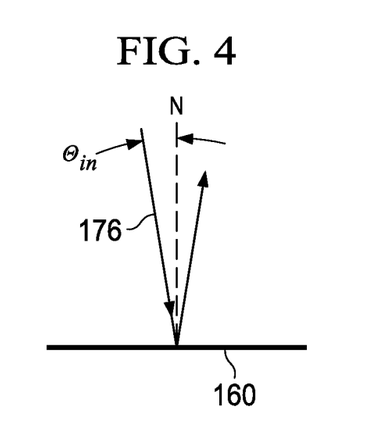
FIG. 4 schematically illustrates a beam of light incident to a dichroic filter in FIG. 3.

Components of the optical system (138) can be arranged such that light from the light sources is incident to the dichroic filters at small incident angles—e.g. closer to the normal direction, as schematically illustrated in FIG. 4.

Referring to FIG. 4, light 176 is incident to dichroic filter 160 at an incident angle $\theta_{in}$. The incident angle $\theta_{in}$ can be 30° or less, 20° or less, or 10° or less to the normal direction N of dichroic filter 160. It is noted that even though FIG. 4 shows only the incident angle of light 176 to dichroic filter 160, other incident angles to the dichroic filters may have the same small angles.

Referring again to FIG. 3, because the light from the light sources can be incident to the dichroic filters at small incident angles, the optical system 138 can be made very compact. For example, the length L of the optical system (138) can be 200 cm or less, 50 cm or less, 20 cm or less, 10 cm or less, or 5 cm or less. The height H of the optical system (138) can be 100 cm or less, 30 cm or less, 10 cm or less, 5 cm or less, or 2 cm or less. In other examples, the optical system may have any suitable dimensions.

In order to ensure the desired performance of the optical system (138), the optical properties of the components in the optical system (138) are desired to be matched. For example, to ensure that the light from the light guides can be successfully delivered to the corresponding prisms of the prism assemblies; and travel between prisms of the same or separate prism assemblies, the light entering a prism of a prism assembly from an light guide is desired to have an incident angle that is smaller than the TIR (totally-internally-reflective) angle of the prism facet through which the light enters into the prism.

The dichroic filters in the exemplary optical systems as discussed above with reference to FIG. 1a through FIG. 4 can be interference optical filters. In another example, the optical system may employ a dichroic filter with segments, such as saw-teeth. For demonstration purpose, FIG. 5 schematically illustrates an exemplary dichroic filter with saw-teeth for reflecting incident light towards a desired direction.

Figure 5:
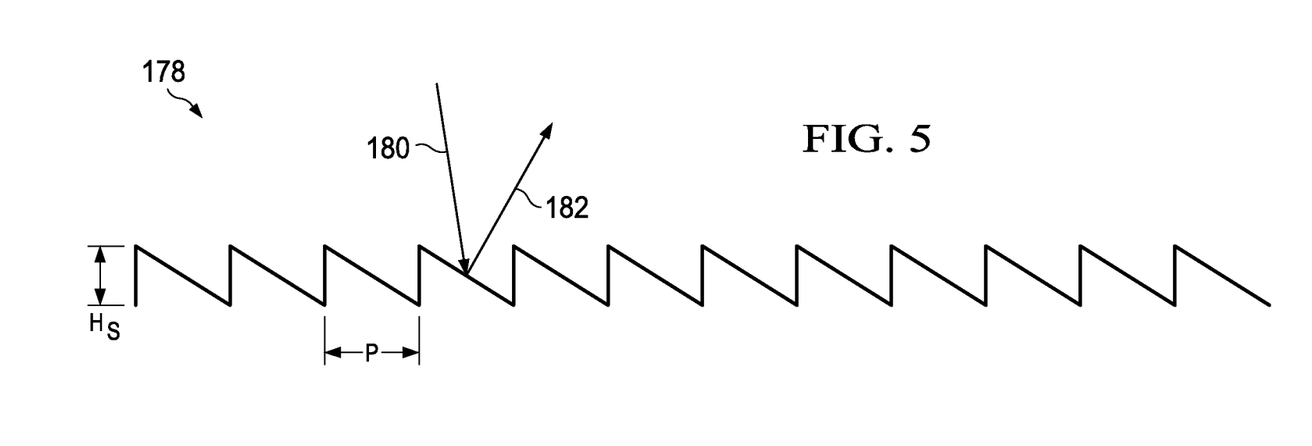
FIG. 5 schematically illustrates an exemplary dichroic filter than can be used in the optical system.

Referring to FIG. 5, dichroic filter 178 in this example comprises saw-teeth segments with period P and height $H_o$. The period P and height $H_o$ can be determined based upon the optical properties of the incident light, such as the wavelength of the incident light. A beam of incident light 180 can be reflected toward direction 182 that is determined based upon the specific profile of the saw-teeth (e.g. period P and height $H_o$). By changing the profile of the saw-teeth, the reflected direction 182 can be along any desired directions. It is noted that a single dichroic filter with saw-teeth fine structures may have multiple periods and different heights according to the specific application. For example, a dichroic filter may comprise two groups of saw-teeth structures. The saw-teeth structure in one group can be arranged to have one period (and/or height $H_o$); while saw-teeth structures in different groups may have different periods (and/or height $H_o$).

The optical systems as discussed above may have many applications, one of which is color imaging systems. For demonstration purpose, FIG. 6 schematically illustrates an exemplary color imaging system that employs an exemplary optical system as discussed above with reference to FIG. 1a.

Figure 6:
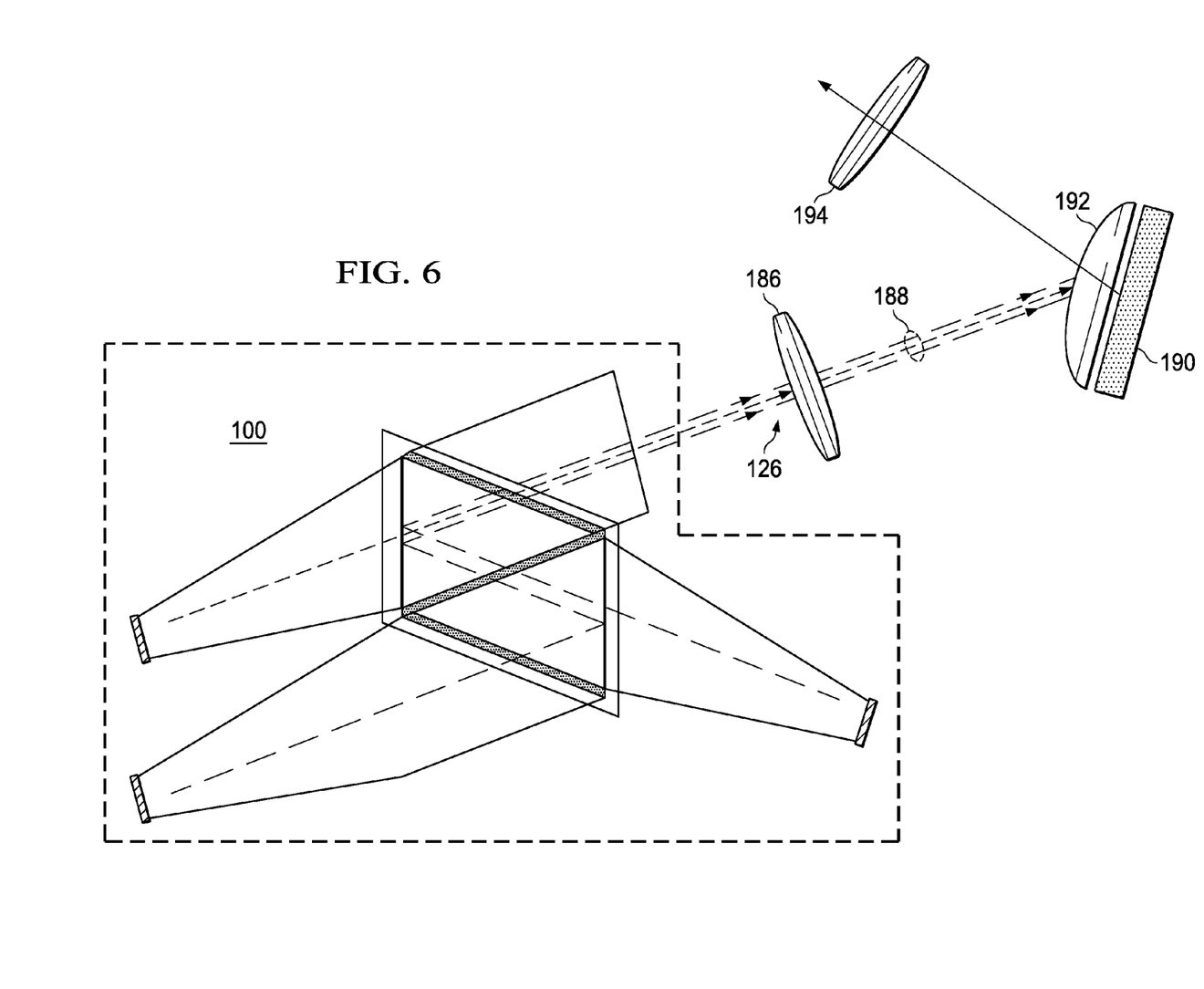

Referring to FIG. 6, the imaging system comprises optical system 100 that can be the same optical system as discussed above with reference to FIG. 1a. The light (126) from the optical system (100) is directed to light valve 190 through field lens 192. In this and later example the light from the exit of the last light guide in optical system 100 (light guide 114 in FIG. 1a) can be imaged onto the light valve to provide an efficient projection system. The light valve modulates the incident light according to image data (e.g. bitplane data) associated with desired images. The modulated light is then directed to projection lens 194 that projects the modulated light onto a screen.

The light valve in this example comprises an array of individually addressable pixels that can be reflective or transmissive. For example, the light valve may comprise one or more reflective micromirror-array devices, or one of more liquid-crystal-on-silicon spatial light modulators.

Figure 7:
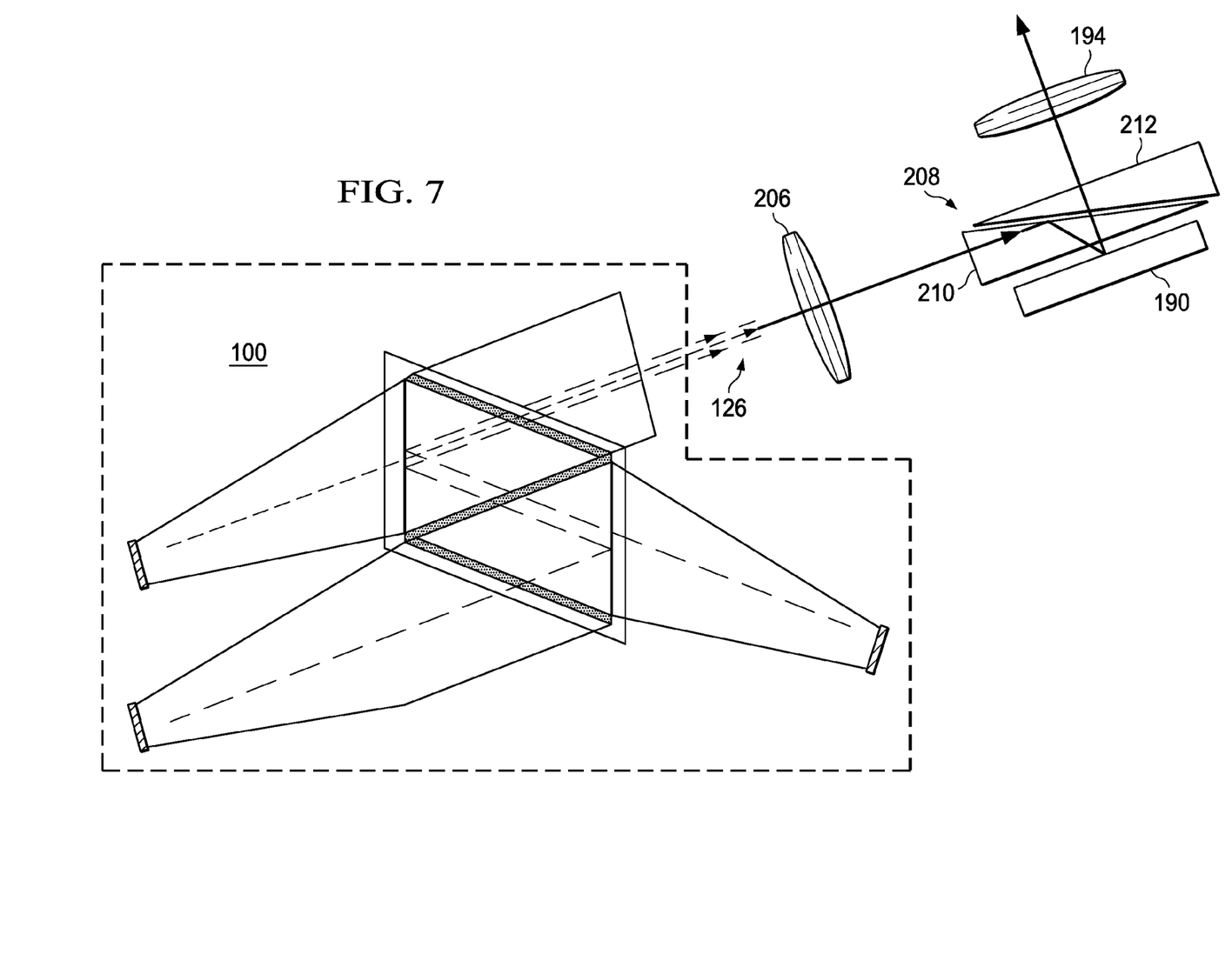

Another exemplary imaging system that employs an exemplary optical system (100) as discussed above with reference to FIG. 1a is schematically illustrated in FIG. 7. Referring to FIG. 7, the imaging system comprises optical system 100 that can be the same optical system as discussed above with reference to FIG. 1a. The light (126) from the optical system (100) is directed to TIR prism assembly 208 through lens 206.

The TIR prism assembly (208) comprises prisms 210 and 212 that form a totally-internally-reflective interface (TIR) that reflects the incident light (126) onto light valve 190. The light valve (190) comprises an array of individually addressable pixels for modulating the incident light. The modulated light passes through prism 212; and is projected by projection lens 194 that projects the modulated light onto a screen.

Figure 8:
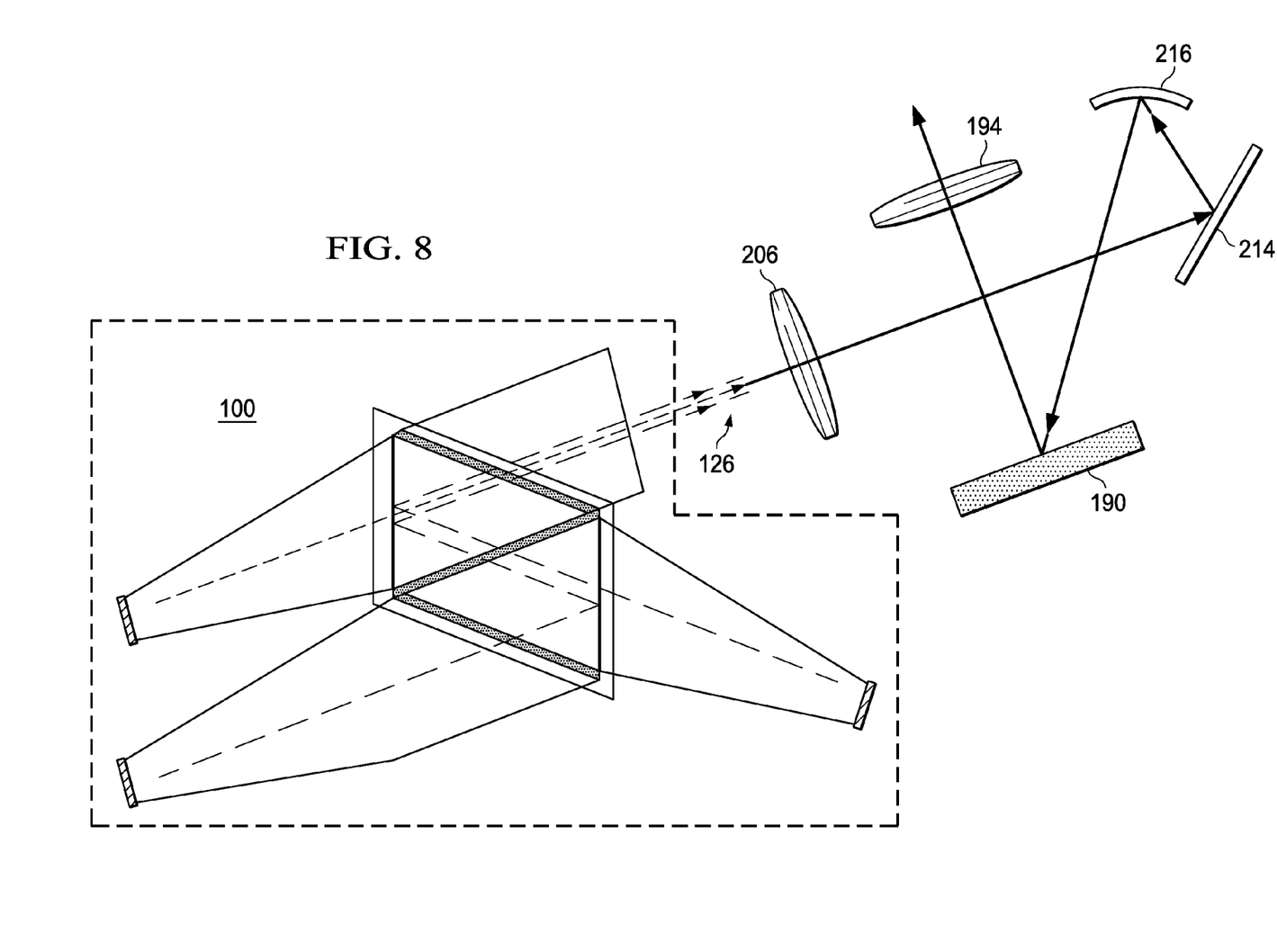

Another exemplary imaging system employing an exemplary optical system as discussed above with reference to FIG. 1a is schematically illustrated in FIG. 8. Referring to FIG. 8, optical system 100 can be the same as that discussed above with reference to FIG. 1a for providing light. The light (126) from the optical system (100) is directed to reflective mirror 214 that reflects the incident light onto a curved reflective surface of mirror 216. The curved reflective mirror (216) condenses the incident light onto light valve 190 that modulates the incident light using an array of individually addressable pixels. The modulated light is then collected and projected by projection lens 194.

Figure 9:
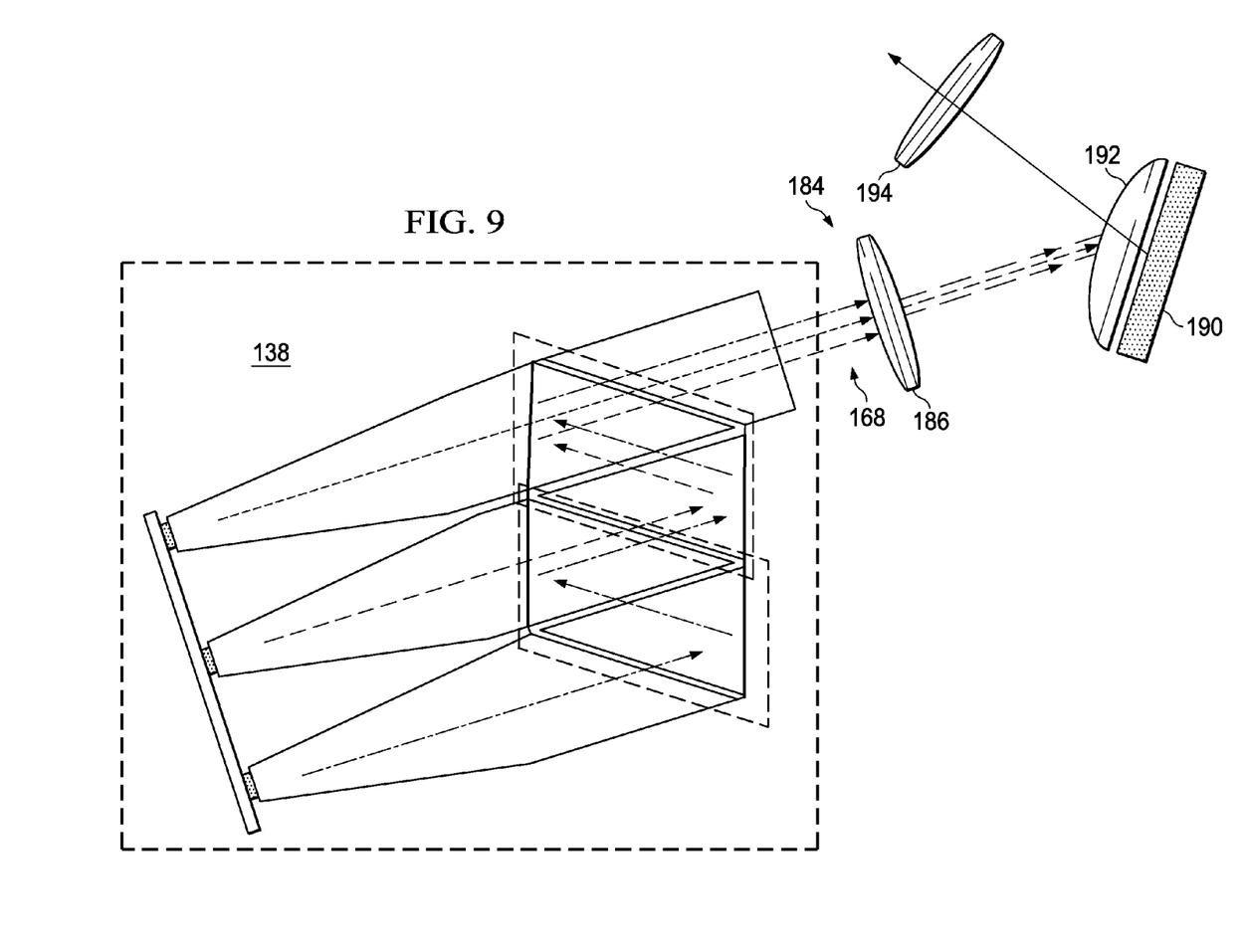
FIG. 9 schematically illustrates an exemplary imaging system that employs an exemplary optical system as illustrated in FIG. 3.

Yet another exemplary imaging system employing an exemplary optical system as discussed above with reference to FIG. 3 is schematically illustrated in FIG. 9. Referring to FIG. 9, the imaging system comprises optical system 138 that can be the same optical system as discussed above with reference to FIG. 3. The light (168) from the optical system (138) is directed to light valve 190 through field lens 192. The light valve modulates the incident light according to image data (e.g. bitplane data) associated with desired images. The modulated light is then directed to projection lens 194 that projects the modulated light onto a screen.

Figure 10:
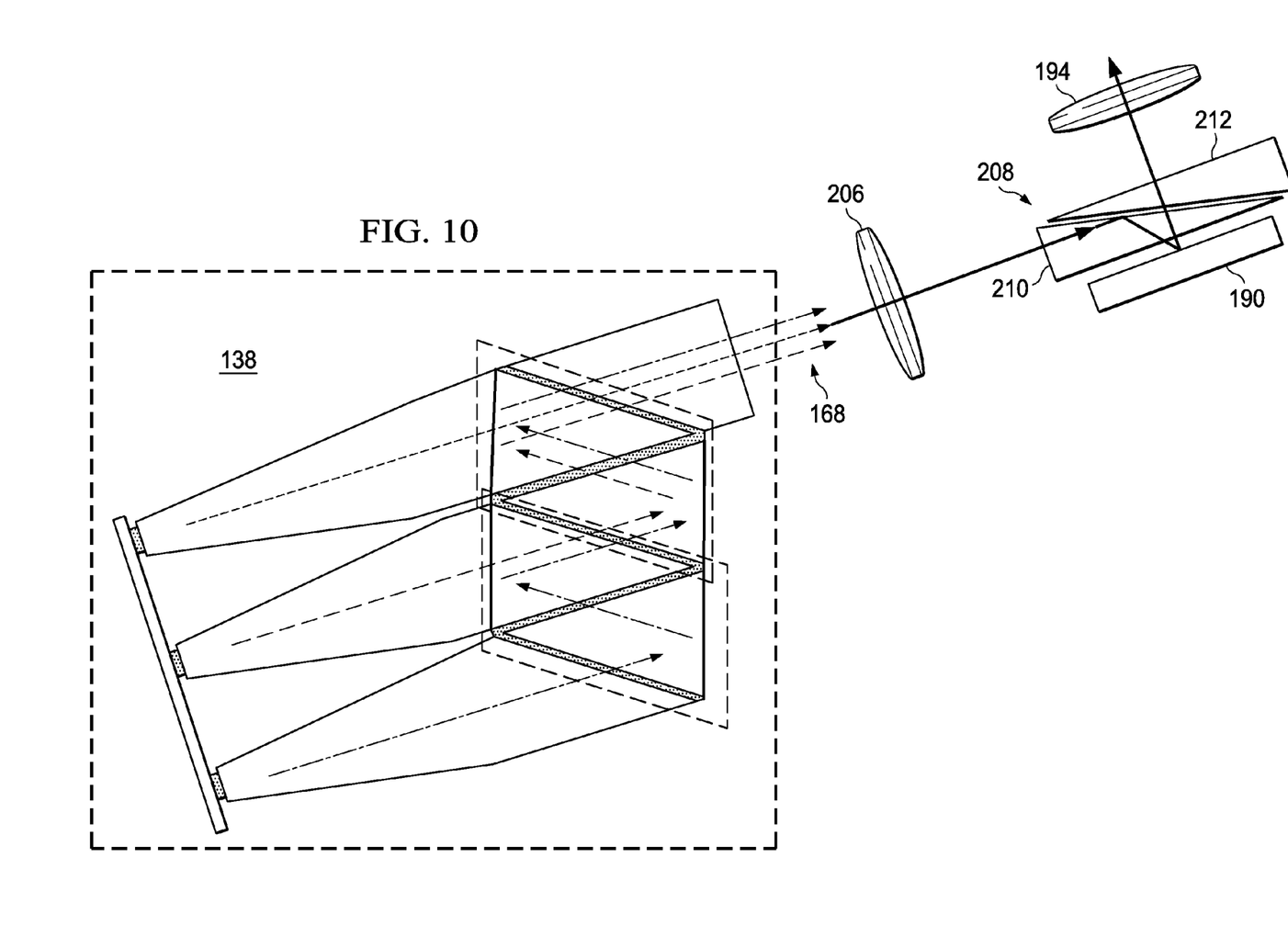
FIG. 10 schematically illustrates another exemplary imaging system that employs an exemplary optical system as illustrated in FIG. 3.

Yet another exemplary imaging system that employs an exemplary optical system (138) as discussed above with reference to FIG. 3 is schematically illustrated in FIG. 10. Referring to FIG. 10, the imaging system comprises optical system 138 that can be the same optical system as discussed above with reference to FIG. 3. The light (168) from the optical system (138) is directed to prism assembly TIR through lens 206.

The TIR prism assembly (208) comprises prisms 210 and 212 that form a totally-internally-reflective interface (TIR) that reflects the incident light (168) onto light valve 190. The light valve (190) comprises an array of individually addressable pixels for modulating the incident light. The modulated light passes through prism 212; and is projected by projection 194 that projects the modulated light onto a screen (not shown).

Figure 11:
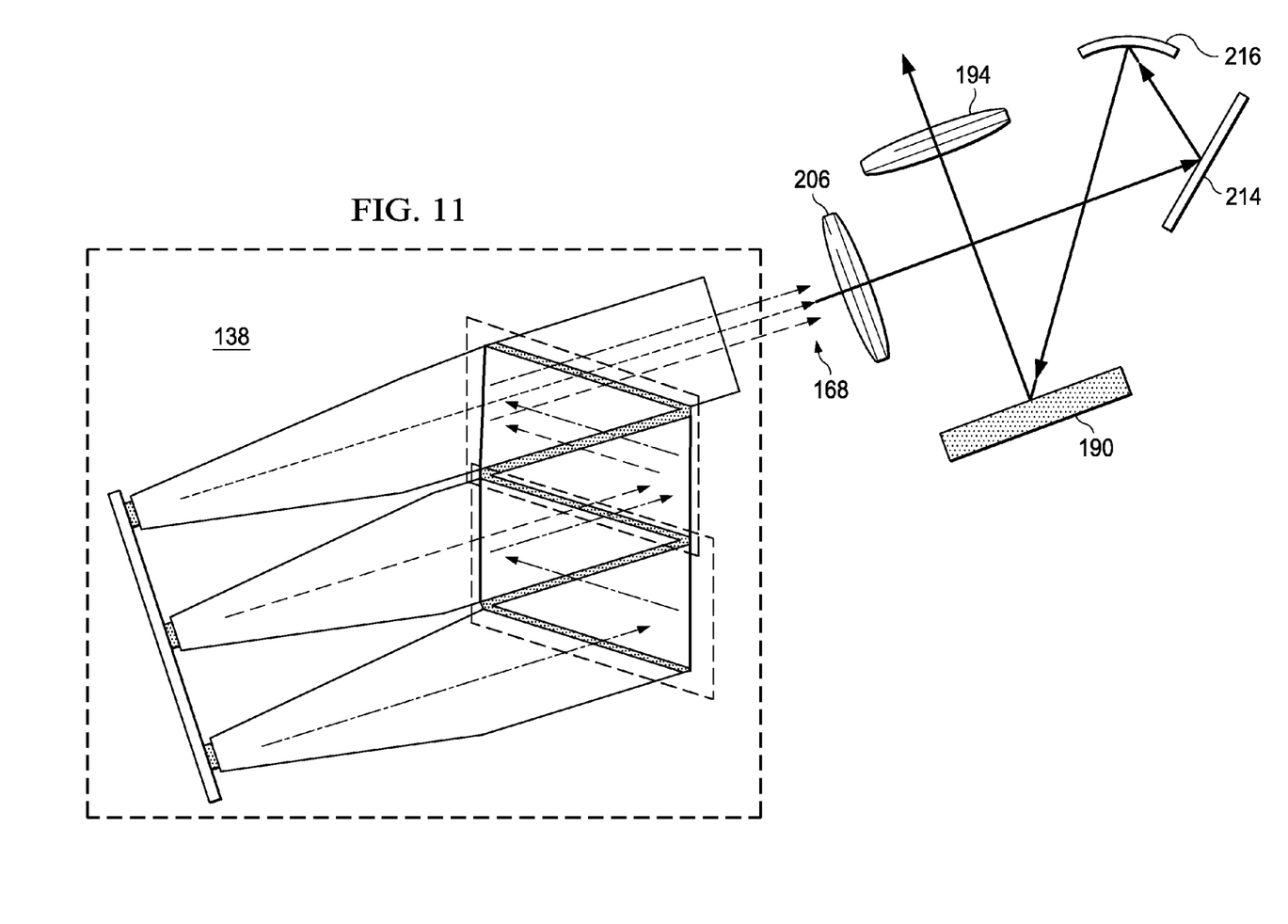
FIG. 11 schematically illustrates yet another exemplary imaging system that employs an exemplary optical system as illustrated in FIG. 3.

Another exemplary imaging system employing an exemplary optical system as discussed above with reference to FIG. 3 is schematically illustrated in FIG. 11. Referring to FIG. 11, optical system 138 can be the same as that discussed above with reference to FIG. 2 for providing light. The light (168) from the optical system (138) is directed to reflective mirror 214 that reflects the incident light onto a curved reflective surface of mirror 216. The curved reflective mirror (216) condenses the incident light onto light valve 190 that modulates the incident light using an array of individually addressable pixels. The modulated light is then collected and projected by projection lens 194.

It will be appreciated by those of skill in the art that a new and useful optical system comprising dichroic filters for directing light from multiple light emitting devices has been described herein. In view of the many possible embodiments, however, it should be recognized that the embodiments described herein with respect to the drawing figures are meant to be illustrative only and should not be taken as limiting the scope of what is claimed. For example, a dichroic filter in any of the preceding embodiments could be replaced by another type of filter, such as a polarization filter. In this case light of different polarizations will be combined, instead of light of different colors. Those of skill in the art will recognize that the illustrated embodiments can be modified in arrangement and detail. Therefore, the devices and methods as described herein contemplate all such embodiments as may come within the scope of the following claims and equivalents thereof.

We claim:

1. An optical device comprising:
    first, second, third and fourth prisms, each having respective first, second and third facets; the second facet of the second prism being bonded to the second facet of the first prism; the third facet of the third prism being bonded to the third facet of the second prism; and the second facet of the fourth prism being bonded to the second facet of the third prism;
    a first dichroic filter disposed on the first facet of the second prism, the first dichroic filter configured to reflect light of a first color and to pass light of a second color; and
    a second dichroic filter disposed on the first facet of the fourth prism, the second dichroic filter configured to reflect light of the first and second colors and to pass light of a third color;
    wherein the first, second and third prisms are arranged, configured and bonded such that:
        light of the first color entering the device through the first prism third facet is reflected by the first prism first facet through the first and second prism second facets to the first dichroic filter, is reflected by the first dichroic filter through the second and third prism third facets to the third prism first facet, is reflected by the third prism first facet through the third and fourth prism second facets to the second dichroic filter, and is reflected by the second dichroic filter through the fourth prism third facet;
        light of the second color entering the device through the second prism first facet passes through the first dichroic filter and through the second and third prism third facets to the third prism first facet, is reflected by the third prism first facet through the third and fourth prism second facets to the second dichroic filter, and is reflected by the second dichroic filter through the fourth prism third facet; and
        light of the third color entering the device through the fourth prism first facet passes through the second dichroic filter and through the fourth prism third facet.

2. The device of claim 1, further comprising:
    a first light guide having an exit that is bonded to the first prism third facet;
    a second light guide having an exit that is bonded to the first dichroic filter; and
    a third light guide having an exit that is bonded to the second dichroic filter.

3. The device of claim 2, further comprising a fourth light guide having an entrance bonded to the fourth prism third facet.

4. The device of claim 2, further comprising:
- a first light source coupled to an entrance of the first light guide;
- a second light source coupled to an entrance of the second light guide; and
- a third light source coupled to an entrance of the third light guide.

5. The device of claim 4, wherein the light guides are disposed such that a principal optical axis of each light guide is substantially aligned to a principal optical axis of a corresponding one of the light sources.

6. The device of claim 5, wherein the light guides have tapered edges lengthwise of their principal optical axes, with narrower entrances and wider exits.

7. The device of claim 6, wherein the wider exit of the first light guide has an area substantially equal to an area of the first prism third facet; the wider exit of the second light guide has an area substantially equal to an area of the second prism first facet; and the wider exit of the third light guide has an area substantially equal to an area of the fourth prism first facet.

8. The device of claim 7, wherein the light guides comprise solid bodies.

9. The device of claim 4, wherein the first, second and third light sources comprise light emitting diodes.

10. The device of claim 9, wherein the prisms are arranged such that light from the second and third light sources is incident at incident angles of 10° or less to the normal directions of the respective first and second dichroic filters.

11. The device of claim 10, wherein the dichroic filters comprise sawteeth segments with period P and height H determined based upon a wavelength of incident light.

12. The device of claim 4, wherein the first facets of the first and second prisms comprise mirrored surfaces.

13. The device of claim 1, further comprising:
- a first light source coupled to emit light of the first color through the first prism third facet;
- a second light source coupled to emit light of the second color through the second prism first facet through the first dichroic filter; and
- a third light source coupled to emit light of the third color through third prism first facet through the second dichroic filter.

14. The device of claim 13, wherein the prisms are arranged such that light from the second and third light sources is incident at incident angles of 30° or less to the normal directions of the respective first and second dichroic filters.

15. The device of claim 14, wherein the prisms are arranged such that light from the second and third light sources is incident at incident angles of 10° or less to the normal directions of the respective first and second dichroic filters.

16. The device of claim 15, wherein the first, second and third light sources comprise light emitting diodes.

17. The device of claim 1, wherein the first, second and third light sources comprise light emitting diodes.

18. The device of claim 1, wherein the first facets of the first and second prisms comprise reflective surfaces.

19. The device of claim 1, wherein the dichroic filters are interference optical filters.

20. The device of claim 1, wherein the dichroic filters comprise sawteeth segments with period P and height H determined based upon wavelength of incident light.

* * * * *